Figure 1:
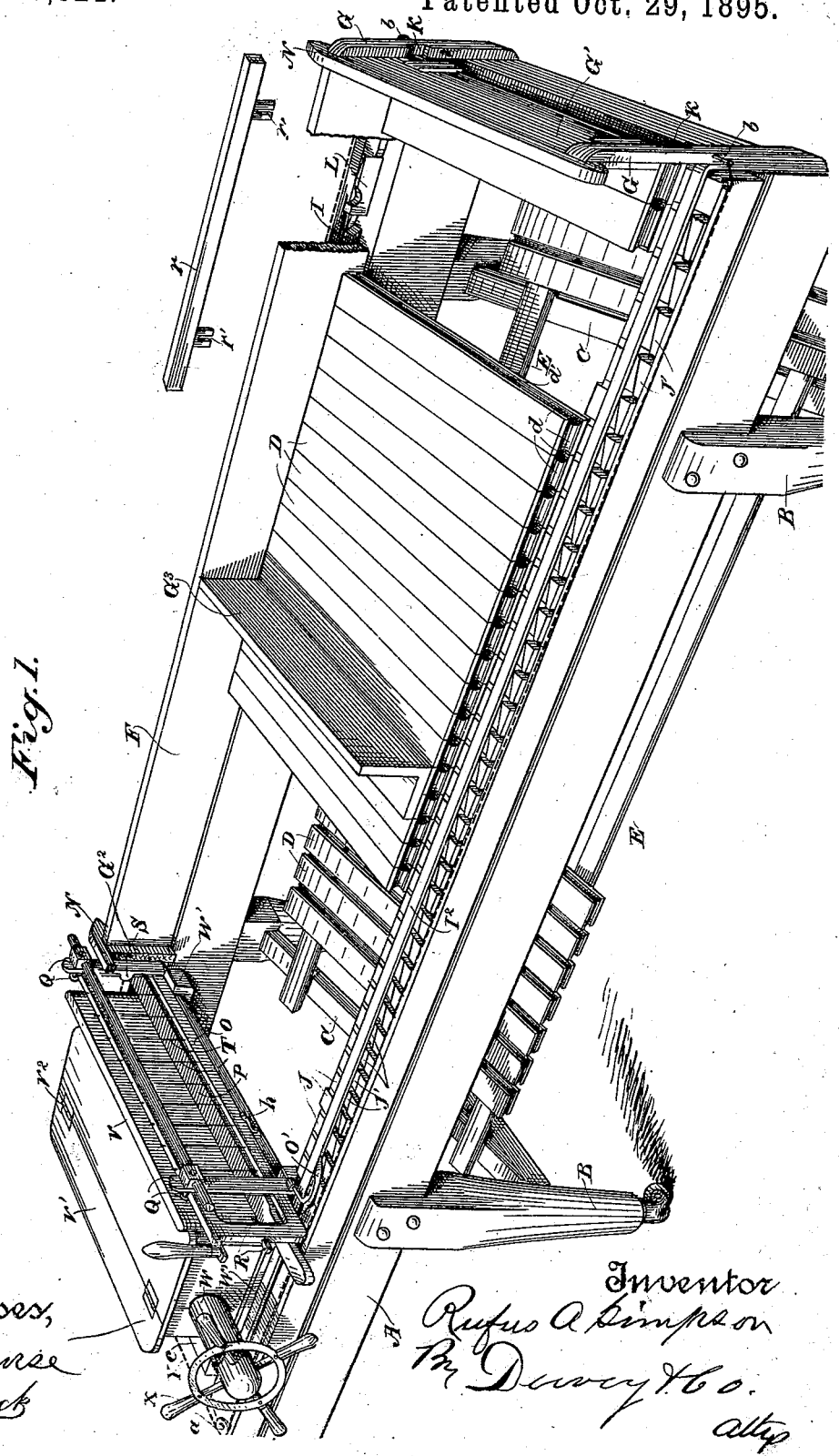

(No Model.) 2 Sheets—Sheet 1.

R. A. SIMPSON.
BUTTER MOLDING AND CUTTING MACHINE.

No. 548,821. Patented Oct. 29, 1895.

Witnesses:

Inventor
Rufus A Simpson
By Dewey & Co.
Attys (No Model.) 2 Sheets—Sheet 2.
R. A. SIMPSON.
BUTTER MOLDING AND CUTTING MACHINE.
No. 548,821. Patented Oct. 29, 1895.
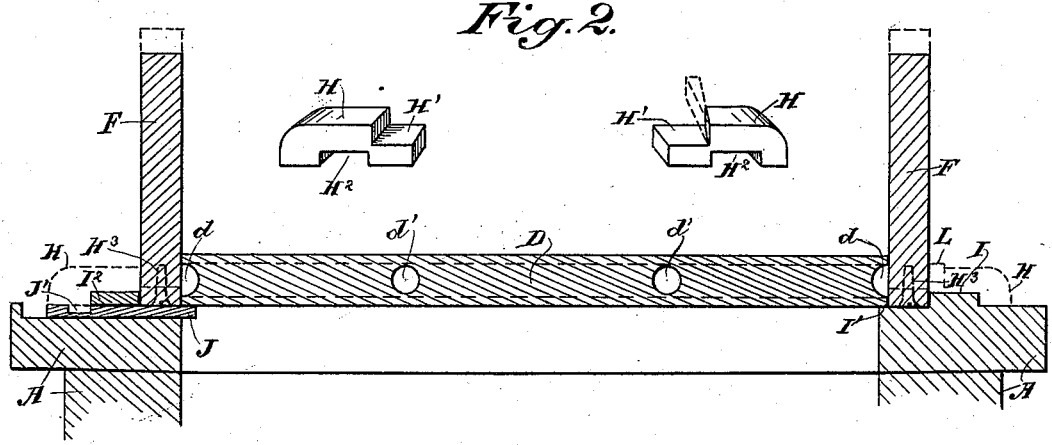
*Fig. 2.*
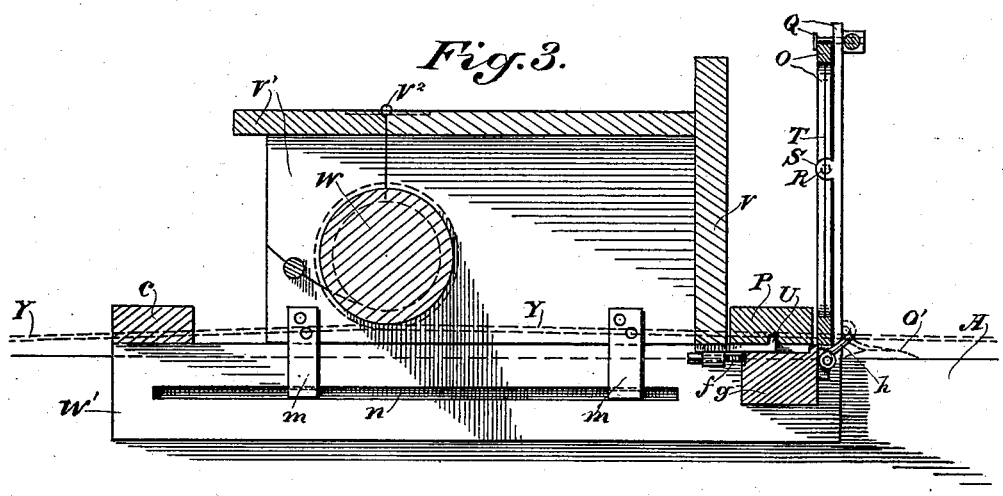
*Fig. 3.*
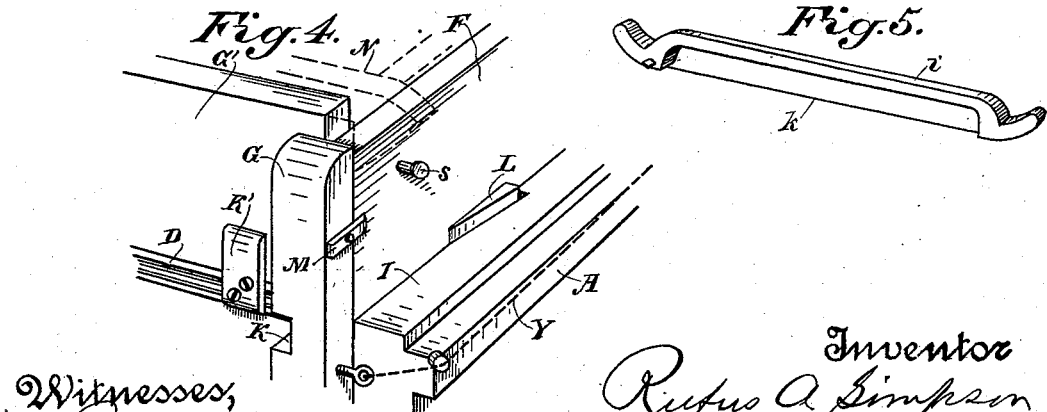
*Fig. 4.*
*Fig. 5.*
Witnesses:
Inventor
Rufus A. Simpson
By Dewey & Co.
Attys

UNITED STATES PATENT OFFICE.

RUFUS A. SIMPSON, OF FERNDALE, CALIFORNIA.

BUTTER MOLDING AND CUTTING MACHINE.

SPECIFICATION forming part of Letters Patent No. 548,821, dated October 29, 1895.

Application filed March 19, 1895. Serial No. 542,388. (No model.)

*To all whom it may concern:*

Be it known that I, RUFUS A. SIMPSON, a citizen of the United States, residing at Ferndale, Humboldt county, State of California, have invented an Improvement in Butter Molding and Cutting Machines; and I hereby declare the following to be a full, clear, and exact description of the same.

My invention relates to an apparatus which is adapted for molding butter and cutting it into packages of suitable size for market.

It consists in details of construction, which will be more fully explained by reference to the accompanying drawings, in which—

Figure 1 is a perspective view of my machine with part broken away. Fig. 2 is a transverse section taken across the side, bottom boards, and frame of the machine. Fig. 3 is a longitudinal vertical section of the traveling box, the roller by which it is advanced, and the cutter-frame. Fig. 4 is an enlarged perspective view of part of the rear end of the machine. Fig. 5 is a view of the device for striking off the top of the butter in the mold.

The object of my invention is to provide an apparatus consisting of a box having the removable sides and bottom, into which box the butter is first packed in solid mass, and a means for dividing the butter into blocks of proper shape and dimensions for the market.

A is a framework supported upon legs B, having wheels or casters by which it is readily removable to any desired point.

C are bars extending diagonally from between the pairs of legs B at each end of the machine and supporting longitudinal bars E, and these bars serve to receive the bottom boards D when the latter are dropped successively as the work of cutting the butter proceeds, so that the bottom boards lie at an angle or inclination upon the bars E, which extend from one end to the other between the inclined bars C, the bottom boards being thus supported and prevented from falling upon the floor, as is plainly shown in Fig. 1.

The side boards F stand upon edge upon the longitudinal frame-timbers A or upon supplemental supports, when desired, as will be hereinafter explained. These boards abut at the outer end against the end posts G, and there are also end boards G' G², which with the sides form a rectangular space so that when the bottom boards are in place, this space may be packed with butter, which is thus molded into form to correspond with the space.

The sides F and the end adjacent to the cutter are removed after the butter is packed and molded, leaving it supported upon the bottom boards and abutting against the outer end board G'.

G³ is an adjustable partition, which may be inserted at any point in the length to form an end when there is less butter than will fill the whole box.

These sides are made of a height to suit the length of the rolls or packages which are to be made from the mass of butter as usually put up by the different dairies for the market. These packages are usually made of different lengths, and the height of the sides above the bottom boards is such as to make the rolls of such length as to give the smallest of the two sizes which are to be put up. When it is desired to make the larger size, I employ blocks H, (shown in Fig. 2,) these blocks having the end H', adapted to project beneath the edges of the side boards F, thus raising the side boards a short distance, as shown in dotted lines in Fig. 2, and this gives the additional height necessary to provide for the greater length of the larger package of butter to be made. These blocks H H are here shown with channels H² formed in the lower sides, and these channels fit over longitudinal tongues, I, which project upwardly from the side bars of the main frame and serve to hold the blocks H in place.

The height of the sides F may be regulated by screws H³, turnable in their lower edges and resting upon the side rails, as shown in Fig. 2. The bottom edges of the side boards F also abut against the tongues I, as plainly shown in Fig. 2, and the removable end board adjacent to the cutter is slidable in vertical channels or grooves in the side boards at that end, the whole being locked or clamped together until the mold has been filled.

The bottom boards D are made with semicircular grooves or channels $d$ at each end and also along their meeting edges, so that an open space is left between the ends of the bottom boards and the sides F and corresponding spaces between the meeting sides of each of the boards. These boards are made of a width about equal to the width or thickness of the squares into which the butter is to be eventually cut, and when laid within the machine are approximately close together, with their ends abutting against the sides F, as shown. The channels $d$ thus extend the whole distance between the sides and the ends of the bottom boards, and the transverse channels extend between each adjacent two of the bottom boards. In addition to these, holes $d'$ are made transversely and horizontally through the bottom boards from edge to edge at convenient or suitable points between their ends, as shown in Fig. 2, and these holes correspond with each other, and, intersecting the transverse channels $d$, serve for a circulation of air or other cooling medium, the object being to cool the butter before it is removed from the machine. They also enable the boards to be readily soaked with brine before using.

The top rail of the frame A on one side projects inwardly a short distance, as shown at $I'$ in Fig. 2, so that at that end the bottom boards D will be supported upon this projecting ledge.

Upon the other side the side board F may stand a little inside the inner surface of the rail A, and in order to support that end of the bottom boards D, I have shown transversely-movable strips J, which are slidable beneath the guide-plate $I^2$ upon that side. These strips J are of a width equal to that of the bottom boards D and each corresponds in position with the end of one of the bottom boards, so that when it is projected a little inside the vertical plane of the top rail and side board F each slide will form a support for that end of one of the bottom boards. The outer ends of these strips extend upward a little higher than the body portion and are beveled or inclined, as shown at $J'$, so that a wedge $O'$, which is carried by the traveling cutter-head, will pass between these beveled ends and the guide-strip under which they extend, and will thus force them back, one after the other, until the end of each bottom board on that side is released successively as the cutter-head advances, and the boards will be allowed to drop upon the supporting-bars and frame C E, thus being disposed of and got out of the way as fast as the butter is cut and removed until the cutting device has reached the end of the mold or form, where the last board is pushed out through a slot or channel beneath the end board of the mold, as shown at K, Fig. 1.

The side boards F are locked in place against the bottom and end boards by means of wedges L, which are driven into corresponding grooves or channels in the top rail of the frame, as shown plainly in Fig. 4. They may also be further locked and secured by buttons M, fixed to the upwardly-extending posts G at this point, and the tops of the said boards may be further clamped in place by transverse bars N, having hooks at the ends which are adapted to clamp over the outside top edges of the side boards.

The bottom board D at the extreme end of the mold opposite to the cutter device is slipped into the groove or channel K, previously described, and is held in place by means of stops $K'$, which are fixed to the ends of this bottom board, so that when it is pushed into place they abut against the outside of the end board $G'$.

The cutter consists of a frame O, preferably made of metal and having wires T stretched vertically from top to bottom. The lower ends of these wires may be secured in any suitable manner in the lower bar of the frame, and the upper ends may be secured and their tension adjusted by means of pins, around which they wind in a manner similar to the keys of violins or other stringed instruments. These vertical wires are so arranged with reference to each other that when the frame is pushed longitudinally with reference to the mold these wires will cut the mass of butter vertically into the proper widths for the size of the packages to be made.

If it is desired to subdivide the packages, one or more wires may be extended across the cutter-frame from side to side, which will make the desired horizontal cut or cuts whenever the frame is advanced lengthwise of the mass of butter. The frame O is also adapted to slide transversely in guides Q. The transverse movement is equal to the distance between the wires P, and it is adjusted and regulated to exactness by means of screws R, passing through the movable ends of the frame O and abutting against stop-plates S, by which the amount of motion of the frame is regulated. Behind this cutter-frame is a transversely-placed bar P, which is situated a little below the level of the bottom boards D, so that when the cutting apparatus is advanced through the mass of butter the bottom board nearest to the frame will be dropped from its position by the disengaging of the slide J which holds it, and as the bar P advances beneath the mass of butter, which has already been cut longitudinally, the butter will be supported upon this bar. The frame O is now moved transversely, and the same wires T separate that portion which is supported upon the bar P into squares, which are exactly the size necessary for packing purposes. This bar P has a longitudinal slot or channel on the under side, and this fits upon an upwardly-projecting guide-piece U, which retains the bar in its proper position and allows it to be withdrawn after the butter has been separated, bringing the number of packages which have thus been severed and which may then be deposited upon the table for packing and the bar returned to its place. Just beyond this bar T is a box or case having a vertical side V, between which and the cutter-frame the separated mass of butter remains. This box is moved back after the butter has been cut, so as to leave the butter free to be withdrawn.

The box has a hinged portion V' at the opposite end, which may be opened about the hinge V², and between this portion and the main portion of the box, through each side, are made semicylindrical openings, which are adapted to receive a roller W, which roller extends across the frame and has a hand-wheel or other device X by which it may be rotated. This roller has wound around it wire ropes Y, which make two or three turns around each end of the roller exterior to the box V V', and pass around guide and regulating pulleys $a$ at the end of the frame, thence extending down along the sides of the frame. The opposite ends are permanently secured to any suitable fastening $b$, which may also be used to regulate the tension of the rope. The proper tension being provided upon these ropes, it will be manifest that whenever the roller W is turned it will be caused to advance along the line of the wire ropes Y, and as it turns within its journals in the box V V' it will be manifest that this box will be advanced while it is thus turned. The box V is mounted upon a head or carrier W', which is slidable upon the frame A, and which carries the cutter-frame upon its front end, and the box V is movable upon the carrier.

The movement of the box in one direction is limited by the stop $c$ shown in Fig. 3 and in the other direction by an adjusting-screw $f$ at the opposite end, which abuts against screw-heads or a metallic plate upon the transverse bar $g$. This movement is just equal to the forward movement of the cutter-frame, which is impelled by it, and it is thus moved a distance sufficient to cut the mass of butter far enough for a series of packages, which extend across the full width of the machine, and these are separated, as before stated, when the cutter-bar is moved transversely. This device is moved forward by turning the roller for each forward movement of the cutter and the box is retracted a distance equal to the thickness of the square by reversing the movement of the roller, and as fast as the butter thus cut is removed it is again advanced until the whole mass has been cut out. By the last movement of this device when the end of the mold has been reached the final bottom board D is forced out through the slot K, as previously described, thus allowing the cutting-wires to cut the last portion of the butter when moved transversely for the last time.

In order to insure the bottom boards dropping out and not sticking to the butter, I have shown a projecting hinged point or points $h$, the end of which is in such position that it will enter one of the longitudinal opening $d'$ in the bottom board, and will thus press it down slightly until it is relieved from any adherence to the mass of butter. As the board falls straight down, the pin $h$ turns about its hinge-point until it is clear of the board, so that it may fall, and a spring which acts upon this pin immediately returns it to its normal position, where it can enter the hole in the next bottom board, and so on, until the end is reached.

When the mold has been filled with butter and properly packed, it is usually made a little higher than the top of the box, and it is then struck off and this portion separated by means of a bow $i$, having a wire $k$ stretched across it. This bow is of sufficient length, so that the wire will travel upon the sides F of the box or mold and will thus separate any butter which projects upwardly above these edges and trim it off perfectly flat. This upwardly-projecting butter can afterward be removed by a suitable scraper, which travels over the edges of the box in the same manner.

Although I have described wire ropes as being employed and passing around the roller W, it will be understood that the device could be advanced by the use of a toothed wheel or wheels upon the shaft W, adapted to engage corresponding rack-bars upon the frame; but I have found that the wire ropes are more easily kept clean, and they are less expensive to manufacture and keep in order.

The guide-wheels $a$ at the corners, around which the ropes pass, serve to keep an equal tension on both sides, so that neither end of the roller will advance beyond the other. The roller will always travel squarely from one end to the other of the apparatus. In its movement the box V V' is guided and kept straight by plates $m$, fixed upon its sides and having inwardly-turned edges, which enter guiding-slots $n$ upon each side of the frame, or one plate may be used upon each side and the front will be kept in place by the guide U.

By means of strips $r$, Fig. 1, having slotted tongues $r'$, and pins $s$, Fig. 4, upon which the tongues fit, the strips $r$ are supported, so as to form an upward continuation of the sides of the mold for a part of its length, and this allows a part of the butter to be cut into short and a part into longer packages, if desired.

Having thus described my invention, what I claim as new, and desire to secure by Letters Patent, is—

1. In a butter molding and cutting machine, the combination with a bottom or bed for supporting the butter, of a series of spaced vertical cutters, means for advancing said cutters in the direction of the length of the bed, whereby the butter is cut longitudinally, and means for moving the cutters transversely whereby the portion separated by the longitudinal cuts is again separated into independent lumps or squares.

2. In a butter molding and cutting machine, a mold or form consisting of removable side boards, bottom boards formed of a series of transverse slats, with means substantially as shown for successively disengaging and dropping each slat, a fixed and a removable end board, a cutter frame adapted to travel longitudinally upon the main frame having vertically disposed cutting wires fixed to it, a mechanism whereby said frame and cutters are advanced to cut the butter longitudinally said frame being movable transversely at the end of each longitudinal cut so as to separate the butter into regular squares with a single set of cutters.

3. In a butter molding and cutting machine, a frame having removable sides, a permanent and a movable end piece, and an advancing cutter frame, bottom boards formed in sections, a projecting ledge upon one side of the frame upon which one of the ends of the bottom boards is supported, and transversely moving slides upon essentially the same level upon the opposite side of the frame by which the opposite ends of the bottom boards are supported, and a means whereby said slides are retracted whereby the boards are allowed to drop as fast as the cutter is advanced.

4. In a butter molding and cutting machine, a main frame, a mold supported thereon consisting of removable sides, a fixed and a movable end, bottom boards formed of independent slats, a ledge upon the main frame by which the ends of the bottom boards are supported upon one side of the mold, retractile slides corresponding in position to the ends of the bottom boards, and each adapted to support the end of one of said boards, an advancing cutter movable longitudinally along the mold, and a means for retracting the supporting slides successively as the cutter advances whereby the bottom boards are allowed to drop away, and a support on which said boards are received beneath the frame-work.

5. In a butter molding and cutting machine, a frame, a mold supported thereon consisting of removable sides and a stationary and movable end board, a bottom formed of independent slats, a ledge upon one side of the frame upon which one end of each of the slats is supported, transversely movable slides by which the other ends are supported, a cutter for separating the mass, movable longitudinally in relation to the mold, a mechanism carried by said cutter frame whereby the slides supporting the bottom boards are successively retracted to allow said boards to drop, and a finger projecting from the cutter frame adapted to engage each of the bottom boards as it is released from its supporting slide, whereby the boards are caused to drop and adherence to the butter is prevented.

6. In a butter molding and cutting machine, a framework or support having removable sides and fixed and movable ends, bottom boards consisting of slats and devices for supporting them to form a continuous bottom, said slats having grooves or channels formed in their ends and meeting edges, and passages made transversely through them for the admission of a cooling or refrigerating medium.

7. In a butter molding and cutting machine, a frame, a mold supported thereon consisting of removable sides, and means for locking said sides in position, a bottom consisting of independent separable slats supported transversely upon a fixed ledge upon one side and movable slides upon the other, a cutter frame having vertically disposed cutter wires fixed to it at intervals from one side to the other whereby the butter is first cut longitudinally by a forward movement of the cutters and guides within which the cutter frame is movable transversely at the end of its forward movement whereby the butter is separated from the mass, and formed into cubes or blocks.

8. In a butter molding machine, a mold or frame within which the butter is first packed, with removable sides and means for locking them in place, a bottom composed of independent boards or slats with fixed supporting ledges upon one side of the mold and movable slides by which the opposite ends of the slats are supported, a frame having vertical cutters affixed thereto, means for moving said frame toward the mass of butter whereby it is separated longitudinally into bars, guides in which said frame is movable transversely to separate these bars into blocks, and adjusting screws R and stops by which the transverse movement of the frame is regulated and adjusted.

9. In a butter molding machine frame, a mold supported thereon, consisting of ends and removable sides and a bottom consisting of independent slats with means whereby said slats are dropped successively, a longitudinally and transversely movable cutter bar having vertically disposed wires fixed thereto and capable of movement in two directions whereby the same wires will cut the mass of butter longitudinally and transversely to separate it into blocks.

10. In a butter molding and cutting machine, a mold, a longitudinally and transversely moving frame with cutter wires fixed vertically within it, a means for advancing the frame, consisting of a roller journaled in a box or frame supported upon the main frame and at the rear of the cutter, wire ropes coiled around said roller and having the opposite ends permanently attached whereby the rotation of the roller coils the ropes and causes the roller and its connected frame to advance.

11. In a butter molding and cutting machine, a frame, a mold supported thereon consisting of end and side boards and successively removable bottom boards or slats, a traveler consisting of a roller journaled in a box or frame at one end of the machine, a wire rope passing around guide pulleys at that end of the machine, extending thence to the roller on each side, and coiled around said roller, and thence extended to the opposite end of the machine where the ends are fixed, means for rotating the roller whereby it is caused to advance along the wire rope, a cutter frame having vertical wires fixed therein, said cutter frame being movable longitudinally with reference to the mold, and a bar or support at the rear of the frame upon which the butter is received after being cut.

12. In a butter molding and cutting machine, a frame, a mold supported thereon consisting of removable end and side boards, and successively removable bottom boards, a carrier slidable upon the frame, and a cutter mounted upon it to divide the butter longitudinally when moved forward, a box or frame mounted upon the carrier and independently movable thereon, with stops to regulate the movement, a roller journaled in the box, and means for engaging the roller with the main frame, whereby the box and carrier may be moved along said frame, and the box independently moved upon the carrier.

In witness whereof I have hereunto set my hand.

RUFUS A. SIMPSON.

Witnesses:
S. H. NOURSE,
H. F. ASCHECK.